United States Patent [19]

Brown et al.

[11] Patent Number: 5,401,527
[45] Date of Patent: Mar. 28, 1995

[54] PROCESS FOR PREPARING IMPROVED HYDROLYZED PROTEIN

[75] Inventors: David A. Brown, Brook, Great Britain; Hendrik W. van meeteren, Opijnen; John D. Simmons, Naarden, both of Netherlands

[73] Assignee: Unilever Patent Holdings B.V., Rotterdam, Netherlands

[21] Appl. No.: 121,259

[22] Filed: Sep. 15, 1993

Related U.S. Application Data

[63] Continuation of Ser. No. 807,815, Dec. 16, 1991, abandoned, which is a continuation of Ser. No. 412,312, Sep. 26, 1989, abandoned.

[30] Foreign Application Priority Data

Sep. 26, 1988 [EP] European Pat. Off. ........... 88202086
Oct. 17, 1988 [GB] United Kingdom ................. 8824241

[51] Int. Cl.$^6$ ................................................. A23J 1/00
[52] U.S. Cl. .................................... 426/656; 426/271; 426/657; 530/370; 530/407
[58] Field of Search ............... 426/656, 271, 656, 657, 426/506, 520, 531; 530/350, 370-379, 407, 412

[56] References Cited

U.S. PATENT DOCUMENTS 4,759,944  7/1988  Fasi et al. .......................... 426/650

FOREIGN PATENT DOCUMENTS

| | | | |
|---|---|---|---|
| 83084 | 5/1979 | Australia. | |
| 0025580 | 3/1981 | European Pat. Off. | ....... C07G 7/00 |
| 0226769 | 7/1987 | European Pat. Off. | . |
| 0298419 | 1/1989 | European Pat. Off. | ....... A23J 3/00 |
| 8703174 | 6/1987 | WIPO. | |

OTHER PUBLICATIONS

Fennema, O. R., Food Chemistry, 1985, pp. 641-642, Marcel Dekker, Inc., New York, N.Y.

*Primary Examiner*—Donald E. Czaja
*Assistant Examiner*—Leslie Wong
*Attorney, Agent, or Firm*—Cushman, Darby & Cushman

[57] ABSTRACT

The invention provides a process for improving HCl-hydrolysed protein by subjecting an aqueous solution thereof to hydrolysis (of monochloropropanediols and dichloropropanols) at a pH between 5.5 and 8.0 at a temperature between 20° and 180° C. for a period between 10 days to 15 minutes. Preferably the pH lies between 6.5 and 8.0, the temperature lies between 80° and 120° C. and the aqueous mixture contains 10 to 85% of solid material Also it is preferred to carry out the hydrolysis is carried out in the presence of 0.1 to 10% (w.w.) of added phosphate, C2–C6 carboxylic acid or salt thereof.

17 Claims, No Drawings

PROCESS FOR PREPARING IMPROVED HYDROLYZED PROTEIN

This is a continuation of application Ser. No. 07/807,815, filed on Dec. 16, 1991, now abandoned, which is a continuation of application Ser. No. 07/412,312, filed on Sep. 26, 1989, now abandoned.

The invention relates to a chemical process for improving hydrolysed protein, in particular to HCl-hydrolysed protein.

The hydrolysis of proteins by treatment with hydrochloric acid was developed by Liebig in the middle of the last century. Since then the method has been extensively employed for the commercial production of food supplements and flavours.

In commercial operations it is customary to hydrolyse the mainly vegetable proteins by boiling them with strong hydrochloric acid followed by cooling and neutralization of the hydrolysate to pH 4.0 to 6.0 with sodium carbonate or sodium hydroxide followed by removal of the solid non-hydrolysed material. The hydrolysis temperature is normally in the range from 100° to 120° C. and the heating from 2 to 24 hours.

The degree of hydrolysis normally is between 60 and 85% of the amide groups, in the case of pure proteins higher degrees of hydrolysis can be obtained.

Suitable protein hydrolysate starting materials can be obtained from casein, soya bean protein, gluten and oil seed cake materials. The protein hydrolysis is carried out in the conventional way whilst stirring the mixture in a reactor which is inert to HCl at higher temperatures.

Studies have shown that protein hydrolysates prepared with hydrochloric acid contain dichloropropanols (DCP), especially 1,3-dichloropropane-2-ol, and monochloropropanediols (MCP), and the problem of their elimination has arisen.

According to GB-A-2 183 659 (Société Des Produits Nestlé SA) hydrochloric acid (HCl) hydrolysed protein is first freed from the insolubles and then subjected to steam distillation under reduced pressure while keeping the density of the hydrolysate at a substantially constant level in order to eliminate especially the 1,3-dichloropropane-2-ol present.

Whilst the elimination of 1,3-dichloropropane-2-ol from HCl-hydrolysed protein is desirable for these food supplements and flavours, there has been a need for methods which remove the full range of dichloropropanols (DCP) and monochloropropanediols (MCP) more efficiently from these products. Also an appreciable reduction in the level of monochloropropanols (MCP) alone is highly desirable.

The present invention provides a method for further improving HCl-hydrolysed proteins by subjecting an aqueous solution thereof to hydrolysis (of MCP's and DCP's) at a pH between 5.5 and 8.0 at a temperature between 20 and 180, preferably between 20° and 125° C. for a period between 10 days to 5 minutes. Although the reaction can be carried out at 20° C. with good results the use of slightly higher reaction temperatures say above 30° C. is often preferred. This hydrolysis can be effected at different pressures, but for practical reasons superatmospheric or atmospheric pressures are preferred.

Preferably the pH of the aqueous hydrolysate solution lies between 6.0, rather between 6.5 and 8.0, the temperature between 80° and 120° C. and an aqueous solution is used containing 10 to 85%, preferably 20 to 60% (w.w.) of solid material. In a more preferred embodiment the pH is kept constant during the reaction at the level of the desired pH by addition of e.g. some NaOH as the hydrolysis proceeds.

Furthermore it has been established that the hydrolysis of the MCP's and DCP's is enhanced by carrying out this reaction in the presence of 0.1 to 10% (w.w.) of added phosphoric acid, C2-C6 carboxylic acid or salts thereof. Suitable compounds to be added are e.g. especially phosphoric acid, acetic acid, lactic acid, citric acid, levulinic acid, succinic acid, adipic acid and propionic acid, but also their sodium, potassium or ammonium salts and mixtures thereof. The hydrolysis is conveniently carried out in enamelled or stainless steel tanks which are stirred whilst the hydrolysis progresses.

In order to remove the MCP's and DCP's even more efficiently the above hydrolysis step is sometimes combined with a steam distillation step in any sequence order. This is particularly beneficial when DCP levels in the starting protein hydrolysate are high. This combination is also useful when e.g. it is desired to combine short periods of hydrolysis with short periods of steam distillation. Preferably the steam distillation is conducted under reduced pressure and using a fractionating column.

In a further preferred embodiment of the invention the steam distillation is carried out at substantially constant amount of water in the hydrolysate, more in particular so that the moisture contents before and after the steam distillation differ less than 20% (w.w.).

To further improve the colour and/or organoleptic quality a bleaching step can be employed, which might comprise treatment with activated carbon.

The protein hydrolysate obtained according to the present invention can be used with advantage as a savoury flavour, in foodstuffs, such as soups, beefburgers, sausages, sauces, goulash etc.

The protein hydrolysates obtained according to the present invention are also excellent starting materials for the preparation of reaction flavours in which the hydrolysates are reacted with mono- and disaccharides, cystein/cystine, thiamine etc in which reaction flavour a major part of the starting amino acids remain unchanged.

The detection method for the monochloropropanediols and dichloropropanols used in the examples of the present invention is described on page 5 of GB-A-2 183 659 (Soc. Prod. Nestle), which method has been extended by improved extraction techniques as to also permit MCP determination.

The invention is illustrated by the following examples:

EXAMPLE I 100 g of an aqueous solution of hydrolyzed maize protein containing 40% solids, of which 40% was NaCl were charged to a 250 ml 3-necked reaction flask equipped with stirrer, thermometer and water condenser. The pH was then adjusted from pH 5.6 to pH 8.0 using a concentrated aqueous NaOH solution (48%) (1.44 g). The solution was then heated to 100° C. for 20 minutes. After cooling the final reaction pH was adjusted back from pH 7.8 (pH drop during reaction) to pH 5.6 with concentrated HCl (35%) (2.66 g). The solution so obtained had good flavour properties. As a result of the treatment the DCP level dropped from 7 ppm to below 0.05 ppm (the detection level) and the MCP level from 26 ppm to below 1 ppm (the detection level).

EXAMPLE II 100 g of an aqueous solution of hydrolysed soya bean protein with a solids content of 40% of which 45% was NaCl were charged to a 250 ml pressure flask and adjusted from pH 5.6 to pH 7.5 using a concentrated aqueous NaOH solution (48%) (0.98 g). The flask was then sealed, placed in a standard kitchen pressure cooker containing the prescribed level of water and heated to 120° C. for 1 hour. After cooling the final reaction pH was adjusted back from pH 7.5 to pH 5.6 with concentrated HCl (1.38 g). The protein hydrolysate solution so obtained contained DCP at a level of below 0.05 ppm (originally 5 ppm) and MCP at a level of below 1 ppm (originally 26 ppm). A subsequent treatment with 4% of activated carbon followed by filtration further improved the product as to colour and taste.

EXAMPLE III 100 g of an aqueous solution of casein hydrolysate, dry matter content 35% of which 30% was NaCl, were charged into a 3-necked reaction flask equipped with a stirrer, thermometer and water condenser and 0.8 g of diammonium hydrogen phosphate were added. The pH was adjusted to 6.5 and the solution was heated and refluxed for 3 hours after which the solution was cooled to room temperature and the pH adjusted to pH 5.6. The solution obtained was an acceptable food additive with a DCP level below 0.05 ppm (originally 10 ppm) and an MCP level of 1 ppm (originally 28 ppm).

EXAMPLE IV 100 g of an aqueous solution of hydrolyzed maize protein, 40% solids of which 40% is NaCl were charged to a 250 ml 3-necked reaction flask equipped with stirrer, thermometer and water condenser. The pH was then adjusted from pH 5.6 to pH 7.5 using concentrated NaOH (48%). The solution was kept adjusted to pH 7.5 and the temperature kept at 100° C. for a reaction period of 1 hour. After cooling the final pH was adjusted back from pH 7.5 to 5.6. The hydrolysed protein solution so obtained was an excellent food additive and contained DCP below 0.05 ppm (originally 12 ppm) and MCP at below 1 ppm (originally 32 ppm).

EXAMPLE V 100 g of an aqueous solution of hydrolysed maize protein solids content 40% of which 40% were NaCl were charged in a reactor and the pH was adjusted from 5..6 to 6.0 using a concentrated (48%) aqueous NaOH solution (0.54 g). The solution was kept at 25° C. for 10 days. Subsequently the pH was adjusted to 5.6 and the solution obtained was found to be an acceptable food additive with a DCP level of below 0.1 (originally 5 ppm) and an MCP level of 2 (originally 22 ppm). The product was further purified by gel permeation chromatography over a column filled with Sephadex G 10 and fractionated to give a final product with an MCP level below 1 ppm.

EXAMPLE VI

Example III was repeated, except that diammonium hydrogen phosphate was replaced by an equimolecular amount of citric acid. A product of comparable composition was obtained.

EXAMPLE VII

Example III was repeated except that no diammonium hydrogen phosphate was added and the hydrolysis was stopped after 1.5 hours by adjusting the pH to 5,6. The remaining DCP was removed from the reaction mixture by steam distillation at atmospheric pressure until the DCP level had dropped below the detection level of 0.05 ppm and an MCP level below 1 ppm. The solution obtained was an excellent food additive.

We claim:

1. A process for improving HCl hydrolyzed protein which contains monochloropropanediols and dichloropropanols which comprises subjecting an aqueous solution of said HCl-hydrolyzed protein to hydrolysis of monochloropropanediols and dichloropropanols at a pH between 6.5 and 8.0 at a temperature between 80° and 180° C. for a period between 4 days to 5 minutes such that the content of monochloropropanediols is reduced by said hydrolysis to a level of about 2 ppm or below.

2. A process according to claim 1, wherein the amount of dichloropropanol compounds present in the hydrolyzed protein product is reduced to 0.1 ppm or below and the amount of monochloropropanol compounds is reduced to 2 ppm or below.

3. A process according to claim 1, wherein the temperature is between 80° and 120° C. and the reaction time is between 4 days and 30 minutes.

4. A process according to claim 1, wherein the aqueous solution contains 10 to 85% (w.w.) of solid material.

5. A process according to claim 1, wherein the hydrolysis is carried out in the presence of 0.1 to 10% of added phosphoric acid or phosphate.

6. A process according to claim 1, wherein the hydrolysis is carried out in the presence of 0.1 to 10% of added $C_2$–$C_6$ carboxylic acid or salt thereof.

7. A process according to claim 1, wherein the hydrolysis is combined with a steam distillation step.

8. A process for improving HCl-hydrolyzed protein which contains monochloropropanediols and dichloropropanols which comprises subjecting an aqueous solution of said HCl-hydrolyzed protein to hydrolysis of monochloropropanediols and dichloropropanols at a pH between 6.0 and 8.0 at a temperature between 80° and 180° C. for a period of between 4 days to 5 minutes in the presence of 0.1–10% (w/w) of added phosphoric acid, C2–C6 carboxylic acids, or salts thereof, such that at least the content of monochloropropanediols is reduced by said hydrolysis to a level of about 2 ppm or below.

9. A process according to claim 8 wherein the pH lies between 6.5 and 8.0.

10. A process according to claim 9 wherein the temperature lies between 80° and 120° C. and the reaction time between 4 days and 30 minutes.

11. A process according to claim 9 wherein the aqueous solution contains 10 to 85% (w.w.) of solid material.

12. A process according to claim 9 wherein the hydrolysis is carried out in the presence of 0.1 to 10% (w.w.) of added phosphoric acid or phosphate.

13. A process according to claim 9 wherein the hydrolysis is carried out in the presence of 0.1 to 10% of added C2–C6 carboxylic acid or salt thereof.

14. A process according, to claim 9 wherein hydrolysis is combined with a steam distillation step.

15. A process according to claim 14 wherein steam distillation is carried out at substantially constant amount of water in the hydrolyzate.

16. A process according to claim 15 wherein the amounts of water before and after the steam distillation differ less than 20% (w.w.)

17. A process according to claim 8, wherein the amount of dichloropropanol compounds present in the hydrolyzed protein product is reduced to 0.1. ppm or below.

* * * * *